Sept. 9, 1958      O. KÖHLER      2,850,868
STEERING WHEEL CLOCK

Filed July 22, 1955      2 Sheets-Sheet 1

INVENTOR:
Otto Köhler
By (signature)
Patent Agent

Sept. 9, 1958     O. KÖHLER     2,850,868
STEERING WHEEL CLOCK
Filed July 22, 1955     2 Sheets-Sheet 2

INVENTOR
Otto Köhler
By
Patent Agent

United States Patent Office 2,850,868
Patented Sept. 9, 1958

2,850,868

STEERING WHEEL CLOCK

Otto Köhler, Nurnberg-Laufamholz, Germany, assignor of one-half to Eduard Hof, Zurich, Switzerland, and one-half to Charles E. A. Sassella, New York, N. Y.

Application July 22, 1955, Serial No. 523,809

Claims priority, application Germany June 15, 1955

2 Claims. (Cl. 58—50)

The present invention relates to a clock for a steering wheel of a vehicle, and more particularly to a clock which is mounted on the hub of a steering wheel and in cooperation with a contact for operating a signal horn.

The horn contact on steering wheels is usually connected to an electric circuit which leads to the winding of the signal horn by passing centrally through the hollow steering wheel shaft. On steering wheels with a contact ring for operating the horn, the end of the electric cable is usually connected to a sleeve or socket which is insulated from the metal parts and carries a disk or the like which for signalling may be depressed by means of the contact ring and thereby grounds the conductive sleeve on the steering wheel shaft so that the circuit will be closed to blow the horn. Instead of passing the cable through the inside of the steering wheel shaft it has also been proposed to extend the cable along the outside of the shaft but inside of the steering column enclosing the shaft, in which case the end of the cable is likewise connected to a contact sleeve which is mounted on a central insulated disk.

A driver of a car or truck often desires to read the time on the clock without first having to switch on the inside lights of the car. For this reason it has been proposed to light up the clock by coating the numerals and hands with a radioactive luminescent substance. Such type of illumination is, however, entirely useless in actual practice since luminous figures can only be read after the eyes have been able to adapt themselves to them. This requires a certain length of time which a careful driver hardly ever has, either because he is slightly blinded by the lights of oncoming cars or because, while driving, he has to keep his eyes on the lighted road.

There is thus an urgent need for a steering wheel clock which is properly illuminated so that the driver can easily read the time thereon instantly and at all times without straining his eyes and without need that they will first have to adapt themselves to the dim illumination of the clocks as usually provided in cars.

It is therefore an object of the present invention to provide such a clock as just described for a car, truck, or other motor vehicle, which may be electrically illuminated without requiring any modification of the customary steering wheel or the arrangement of the cable for supplying the necessary current for such illumination.

Another object of the present invention is to provide a simple circuit arrangement which may be used for a variety of purposes and only requires a single cable within the steering wheel shaft. The invention thus avoids the provision of any additional cable or cables as are used, for example, on steering wheels where the contact ring on the steering wheel may be used for giving different signals depending upon which half of the contact ring is depressed. The provision of several cables within the steering wheel shaft has been avoided according to the invention also for the reason that experience has taught that the larger the number of individual wires, the larger will be the number of defects which might occur and that, consequently, neither the clock nor the horn signals will be operating properly and reliably. The present invention also affords a possibility of combining the illumination of a clock on the steering wheel with other electric apparatus, for example, an electric clock winding mechanism, so as to be connected to the horn-signal circuit of the vehicle.

A feature of the invention consists in providing a circuit connecting the electrical appliances which are contained in the clock housing so as to be parallel to the horn-signal contact. By such an arrangement it will be possible to maintain these appliances within a closed circuit so as to be constantly under current. For separating the horn circuit from such main circuit so that it will not be under current to give a signal unless desired, the invention provides for the other electrical appliances to have a resistance considerably higher than the resistance of the horn winding, and to build the latter so as preferably not to require more than 10% of the total resistance of the circuit. The strength of the constantly flowing current will thus be so small as to be insufficient to operate the horn but fully adequate to supply the other appliances.

Another feature of the invention resides in providing the current-consuming appliance so as to rest by means of a contact spring on the terminal socket of the main cable, and to have the other pole thereof connected to ground. Such construction permits the appliance which is mounted in the clock housing to be removed from the horn contact ring together with the clock without requiring any screw contacts or the like to be loosened or disconnected. When inserting the clock into the horn contact ring, the circuit will then be closed automatically by the engagement of the contact spring.

The electrical current-consuming appliance according to the invention consists of at least one electric lamp within the clock housing. An additional appliance to be provided in the clock housing may consist of an electromagnet for an electric winding mechanism, if the clock to be used is of such a type.

Considering that in daytime or when the car is parked, it will be unnecessary that the clock be illuminated, a suitable switch may be provided in the line of the appliances which runs parallel to the horn contact. In such a manner it is possible to interrupt the circuit of the appliances without disconnecting the horn. Such arrangement is important especially in vehicles in which it should be possible to blow the horn even after the ignition key has been withdrawn.

Further objects, features, and advantages of the present invention will be apparent from the following detailed description particularly when read with reference to the accompanying drawings, in which—

Fig. 4 shows a cross section through a signal ring of a steering wheel provided with a clock, an electric winding mechanism therefor and a lamp for illuminating the clock; while

Figure 1:
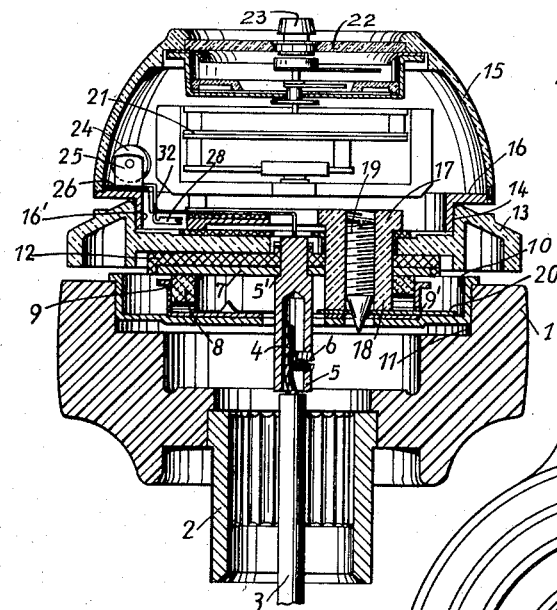
Fig. 1 shows a cross section through the hub of a steering wheel which is provided with a signal ring and a clock according to the present invention.
Figure 3:
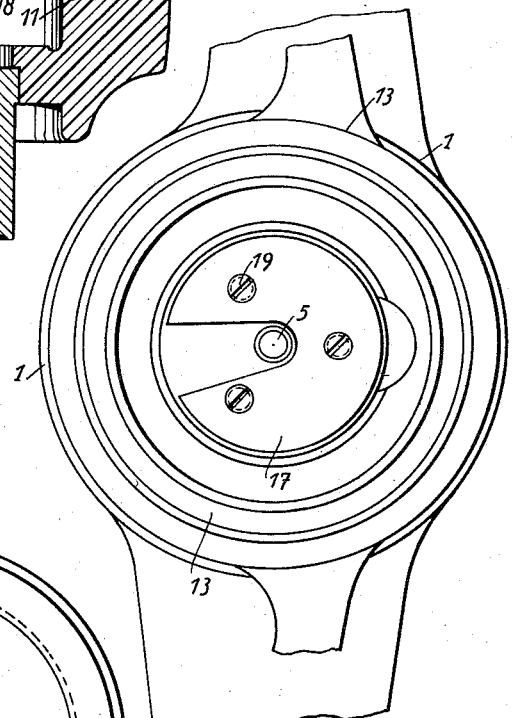
Fig. 3 shows the hub of the steering wheel with the signal ring after the the clock has been removed therefrom.
Figure 2:
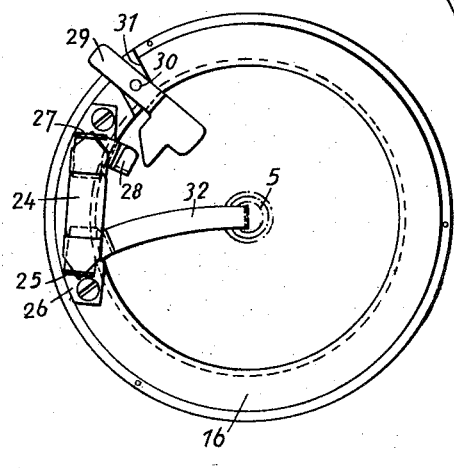
Fig. 2 shows a plan view upon the bottom of the clock housing and of the lamp for illuminating the clock and the switch for operating the same.

Referring to the drawings, and first particularly to Figs. 1 to 3, the hub 1 of the steering wheel is mounted on the end socket 2 of the steering wheel shaft which as such is not shown in the drawings. An insulated wire 3 passes centrally into hub 1 and is connected first to the signal horn of the car and then to the positive terminal of the battery of the car. The free end 4 of wire 3 is secured by means of a screw 6 in a socket 5 which has a shoulder 5' on which an annular metal disk 7 is mounted below which a rubber ring 8 is secured which extends into a cup-shaped member 9 and fits closely against the inside wall thereof. Member 9 is secured to the inside of a larger cup-shaped member 10 which, in turn, is fitted into a recess 11 of the hub 1. Members 9 and 10 are made of sheet metal and serve as electrical conductors. An insulating disk 12 rests directly on the metal disk 7 and encloses the rim thereof. Disk 7 is thus insulated on both sides, that is, by rubber ring 8 and insulating disk 12, respectively. The signal ring 13 for operating the horn is mounted on insulating disk 12. The latter has a central recess 14 in which the clock housing 15 is mounted which is removably fitted into recess 14 by means of the circular rim 16' on the bottom 16 of housing 15. For securing all of the mentioned parts onto each other in an axial direction, a cover 17 is mounted centrally thereon and carries integrally therewith a hollow knob 18 which extends through hub 1, insulating disk 12, and contact disk 7. Knob 18 has threadedly mounted therein a setscrew 19 which, when screwed downwardly, shifts a slide member 20 along the bottom of the cup-shaped member 9 through slot 9' in outward direction, whereby the hollow knob 18 and cover 17 thereon will be firmly secured to member 9.

The clock mechanism in clock housing 15 is indicated in Fig. 1 generally by the numeral 21. Clock housing 15 is closed in upward direction by a transparent disk 22 through which the hand-setting screw 23 passes centrally thereof. The clock dial is disposed below transparent disk 22 and is made of translucent material so that a source of light mounted below will illuminate the dial by lighting through the same. In the embodiment of the invention shown in Figs. 1 to 3, this light source consists of a light bulb 24 which is removably inserted between sockets 25 and 27 which are mounted on the annular bottom 16 of housing 15 and are insulated therefrom by insulating members 26.

As illustrated in Figs. 1 and 2, contact socket 5 is electrically connected with the lamp socket 25 of light bulb 24 by means of a contact spring 32, one end of which is bent downwardly and rests under spring pressure upon the upper end of socket 5. The other lamp socket 27 carries another contact spring 28 which may be metallically connected with housing 15 and thus grounded by means of a handle 29 which is pivotally mounted at 30. One of the arms of handle 29 projects laterally through an aperture 31 to the outside of housing 15. When handle 29 is turned to engage contact spring 28, the latter will be grounded through such handle. The circuit of light bulb 24 will thus be closed and the bulb will light up. When the driver depresses the signal ring 13 to blow the horn, contact disk 7 engages with the edge of the cup-shaped member 9 so that the circuit of the horn will be closed directly at this point, thus sounding the horn.

Figure 4:
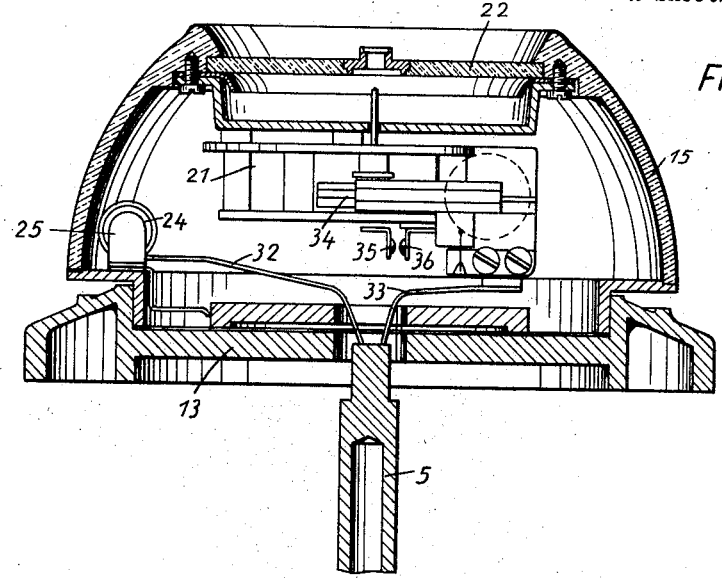

Fig. 4 illustrates a modification of the present invention in which the clock is provided with an electromagnetic winding mechanism. A contact socket 5 similar to that shown in Fig. 1 is in this case engaged not only by a contact spring 32 leading to light bulb 24, but also by a second contact spring 33 which leads through the winding of the armature 34 of the electromagnet to housing 15 and thus to ground. The clock to be used may, for example, be one in which every time when the clock spring is unwound, a contact will be closed for a short time, and in which the clock spring will then be rewound by the movement of the armature 34. When in the particular embodiment illustrated in Fig. 4 the clock spring is unwound, the two contacts 35 and 36 are automatically brought into engagement with each other, whereby the armature circuit will be closed and the clock be rewound. The other parts of the clock shown in Fig. 4 correspond to those shown in Figs. 1 to 3 and therefore carry the same reference numerals as used therein.

The present invention shall now be finally described with reference to the wiring diagram shown in Fig. 5. The negative terminal of the battery is grounded and the positive terminal connected to the line which leads through the winding of the signal horn and a horn contact 13, i. e. the contact ring 13, and then likewise to ground. The respective electric appliance, for example, a lamp 24 which is provided with a switch 29 is connected in parallel with the horn contact 13.

Figure 5:
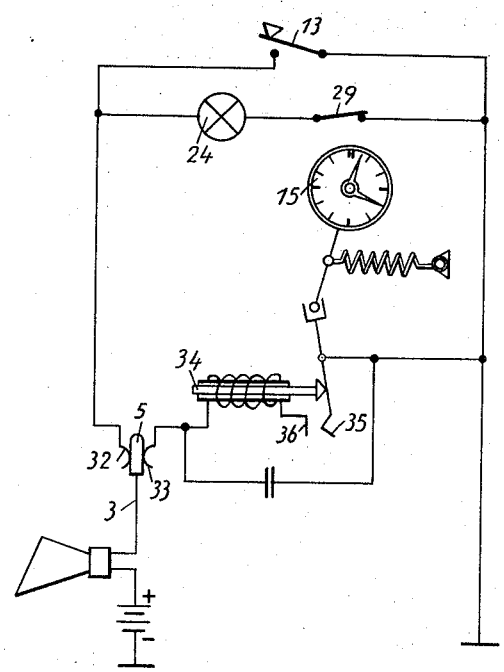
Fig. 5 shows a wiring diagram for the clock according to the invention.

If a second electric appliance, for example, the electric winding mechanism of a clock 25 be provided, the same may be likewise connected in parallel with the horn circuit, as clearly illustrated in Figs. 4 and 5.

Although described and shown with reference to a horn contact consisting of a ring 13 surrounding the bottom of the clock housing 15, the invention may also be applied with slight modifications to a horn button which is mounted in the center of the steering wheel. In such a case, the clock housing itself may also form the horn button.

Although my invention has been illustrated and described with reference to the preferred embodiments thereof, I wish to have it understood that it is in no way limited to the details of such embodiments or to the specific examples described, but is capable of numerous modifications within the scope of the appended claims.

Having thus fully disclosed my invention, what I claim is:

1. In a vehicle provided with a steering column, a steering wheel rotatably mounted at one end of said steering column; the improvement comprising, a signal horn, a normally open horn contact member supported at said one end of said steering column for operating said signal horn, a clock housing supported by said steering column and disposed adjacent said horn contact member, a clock including a clockworks located within said clock housing, electric illuminating means including a normally open switch carried by said housing, an electric circuit for said signal horn connecting in parallel said horn contact member and said electric illuminating means, said electric circuit including an insulated metallic socket connected to a current source and at least one contact spring engaging said socket and in circuit with said illuminating means, said illuminating means being provided with sufficent electrical resistance with respect to the resistance of said signal horn so that the latter is not operated when said electric circuit is closed by said normally open switch of the electric illuminating means.

2. In a device as set forth in claim 1, wherein said clock is of the electric winding type provided with an electromagnet for its operation, and in a second contact spring is disposed between said socket and said electromagnet, said electromagnet being provided with sufficient electrical resistance with respect to the resistance of said signal horn, so that the latter is not operated when said electromagnet is energized.

References Cited in the file of this patent

UNITED STATES PATENTS

| | | |
|---|---|---|
| 2,065,611 | Pulleyblank | Dec. 29, 1936 |
| 2,234,527 | Hollingsworth | Mar. 11, 1941 |
| 2,254,536 | Loeffler | Sept. 2, 1941 |

FOREIGN PATENTS

| | | |
|---|---|---|
| 695,926 | France | Oct. 6, 1930 |
| 858,957 | Germany | Jan. 29, 1953 |
| 1,041,190 | France | May 27, 1953 |